(12) United States Patent
Sutton et al.

(10) Patent No.: US 8,950,976 B2
(45) Date of Patent: Feb. 10, 2015

(54) REVERSE OSMOSIS IRRIGATION

(75) Inventors: Bruce Gregory Sutton, Russell Lea (AU); Gregory Lawrence Leslie, Bexley (AU)

(73) Assignee: The University of Sydney, Sydney, New South Wales (AU)

( * ) Notice: Subject to any disclaimer, the term of this patent is extended or adjusted under 35 U.S.C. 154(b) by 581 days.

(21) Appl. No.: 12/919,211

(22) PCT Filed: Feb. 25, 2009

(86) PCT No.: PCT/AU2009/000206
§ 371 (c)(1),
(2), (4) Date: Nov. 29, 2010

(87) PCT Pub. No.: WO2009/105808
PCT Pub. Date: Sep. 3, 2009

(65) Prior Publication Data
US 2011/0070028 A1  Mar. 24, 2011

(30) Foreign Application Priority Data
Feb. 25, 2008 (AU) .............................. 2008900899

(51) Int. Cl.
| A01G 25/06 | (2006.01) |
| A01G 25/00 | (2006.01) |
| A01G 25/02 | (2006.01) |
| B05B 15/00 | (2006.01) |
| B01D 61/08 | (2006.01) |
| B01D 69/04 | (2006.01) |
| B01D 71/16 | (2006.01) |

(52) U.S. Cl.
CPC ................ *A01G 25/06* (2013.01); *B01D 61/08* (2013.01); *B01D 69/04* (2013.01); *B01D 71/16* (2013.01)
USPC ............................... 405/45; 47/48.5; 239/542

(58) Field of Classification Search
USPC ........................................ 405/43, 45; 47/48.5
See application file for complete search history.

(56) References Cited

U.S. PATENT DOCUMENTS

| 3,762,170 | A | * | 10/1973 | Fitzhugh .................... 405/38 |
| 3,774,850 | A |   | 11/1973 | Zeman |
| 3,850,203 | A |   | 11/1974 | Shobert |
| 4,139,159 | A |   | 2/1979  | Inoue et al. |
| 6,178,691 | B1 |  | 1/2001  | Caron et al. |

FOREIGN PATENT DOCUMENTS

| GB | 2096266 A | 10/1982 |
| WO | 8907392 A1 | 8/1989 |
| WO | 9427728 A1 | 12/1994 |
| WO | 03055294 A1 | 7/2003 |
| WO | 04110132 A2 | 12/2004 |

OTHER PUBLICATIONS

International Search Report, PCT/AU2009/000206, dated Apr. 29, 2009.

* cited by examiner

*Primary Examiner* — Tara M. Pinnock
(74) *Attorney, Agent, or Firm* — Nixon Peabody LLP

(57) ABSTRACT

A plant watering device is disclosed. The device has a preferentially water permeable membrane arranged to separate a supply of water from a root system of a plant. The membrane is arranged to allow water to permeate to water the roots.

22 Claims, 5 Drawing Sheets

REVERSE OSMOSIS IRRIGATION

CROSS REFERENCE TO RELATED APPLICATIONS OR PRIORITY CLAIM

This application is a national phase of International Application No. PCT/AU2009/000206, entitled, "Reverse Osmosis Irrigation", which was filed on Feb. 25, 2009, and which claims priority of Australian Patent Application No. 2008900899, filed Feb. 25, 2008.

FIELD OF THE INVENTION

The present invention generally relates to the irrigation of plants, and particularly but not exclusively to the irrigation of plants using water from a reverse osmosis process.

BACKGROUND OF THE INVENTION

In many agricultural precincts there are large numbers of existing groundwater bores that access aquifers containing brackish water. Brackish water is the term applied to water with concentrations of dissolved salts generally in excess of 2000 mg/L. The salt concentration can be expressed in terms of electrical conductivity (EC). EC is the parameter that is measured in irrigation operation to determined if it is safe to apply water to plants and soil. As a general rule, groundwater bores with EC in excess of 3000 microsiemens per centimeter are unsafe to use for sustained irrigation.

There are three traditional approaches to using brackish water for irrigation. First, the water may be directly used. This suffers from the obvious problems of sensitivity of the plants to salt, leading to yield reductions and the need to leach the soil profile to control salt accumulation, which leads to drainage issues. Ultimately, damage to the soil, loss of yield and poor drainage make this an unattractive solution.

Secondly, there have been attempts to mix, or alternate, brackish water irrigations with fresh water irrigations. This requires exacting management of the water mixing regime, does not eliminate all the problem of yield loss and is attended by the need for leaching to remove salts from the root zone.

Thirdly, desalination through forcing water through a semipermeable membrane by pressurizing brackish water behind the membrane, has been explored as a means of preparing water of suitable quality for sustained irrigation. The desalinated water is stored in a holding tank and then delivered using standard irrigation infrastructure. Typically, this results in expensive water for a number of engineering reasons:

The reverse osmosis systems requires additional infrastructure including a dedicated feed pump, cleaning system and source of electrical power from either a generator or connection to a distributed power supply The reverse osmosis feed pump operates at high pressure. Operating conditions in the membrane module predispose the system to precipitation of salts, scaling and fouling.

Capital and Operating costs are high.

SUMMARY OF INVENTION

According to a first aspect of the invention there is provided a plant watering device, the device comprising:

a semipermeable membrane arranged to separate a supply of water from a root system of a plant, the membrane being arranged to allow water to preferentially permeate to water the roots.

In some embodiments the membrane is arranged to allow water to pass in response to a soil and/or root water potential.

In some embodiments the supply of water contains a dissolved salt. The water may be brackish water.

In some embodiments, the membrane has selective transport properties of the water and the salt. The membrane may be a reverse osmosis membrane. The membrane may be a cellulose based membrane. The membrane may be a cellulose acetate membrane. Alternatively, the membrane may be prepared from synthetic monomers and polymers. The membrane may be a dense polymer membrane. The membrane may be a polyamide membrane. The membrane may be chemically modified to achieve optimum water and salt transport properties. Alternatively, the membrane may be an ultrafiltration and/or a nanofiltration membrane.

In some embodiments the membrane is arranged to be degradable and/or soluble. The membrane may be arranged to degrade after one cropping cycle. The degradation may be done in situ by the addition of chemicals at the end of the cropping cycle. Alternatively, the degradation may be done in situ by the addition of chemicals at the end of an irrigation cycle.

In some embodiments, the membrane is configured as a conduit. The conduit may be arranged to transport the water along it. The membrane may comprise opposing edges joined together forming the conduit. The edged may have been fused by heat annealing. An adhesive may join the opposing edges.

In some embodiments, the device comprises a water permeable conduit, and the membrane is associated with the conduit. The membrane may line the conduit. The conduit may be configured to promote turbulence in water adjacent the membrane. The conduit may comprise one or more features that shape the membrane for the promotion of the turbulence. The features may comprise ridges. The features may comprise bumps. The features may comprise dimples. The features may be located adjacent the membrane.

In some embodiments, the conduit may be arranged for burial to provide irrigation water to an annual crop. Alternatively, the conduit may be arranged for use in permanent planting applications.

In some embodiments, the device may comprise a drip irrigation line. The drip irrigation line may be configured as a drip irrigation tape or as a porous polymer tube.

In some embodiments, the device is configured to promote turbulence in water adjacent the membrane. The membrane may be configured to promote the turbulence. The membrane may comprise a surface configured to promote the turbulence. The surface may comprise features for promoting the turbulence. The surface may comprise one or more ridges. Alternatively, the membrane is located around a structure configured to promote turbulence in water adjacent the membrane. The structure may comprise a framework. The framework may comprise a material other than the material that constitutes the membrane. The material may comprise a polymer or any other suitable material.

It will be appreciated that the ridges could be configured in many different ways. The ridges may be parallel. The ridges may be arranged in a spiral pattern. The ridges may cross each other. The ridges may be arranged in a cross hatched pattern. The ridges may cross each other perpendicularly. The ridges may extend parallel to a nominal central axis of the conduit. Alternatively, the ridges may extend perpendicularly to the axis. Alternatively, the surface comprises bumps and/or dimples.

In some embodiments there are one or more intermediate layers between the membrane and the conduit.

In some embodiments the membrane has two opposite faces and one of the faces is arranged to be contactable with the supply of water. The other face may be arranged to be in contact with a water wicking medium or medium with a low water potential. The wicking medium may include the conduit.

In some embodiments the wicking medium includes a wicking medium portion that supports a root or root system of the plant. The water wicking medium may comprise of soil or a soil analogue. The water wicking medium may be inert. The water wicking medium may comprise green waste. The water wicking medium may comprise course sand. The water wicking material may comprise botany sand. The water wicking medium may comprise composted hardwood sawdust.

In some embodiments the supply of brackish water may have a pressure in the range of ambient pressure to a few atmospheres of pressure.

In an embodiment, the device comprises a water holding material. The water holding material may be porous, sponge-like, or soil-like.

In some embodiments the membrane is permeable to a fertilizing chemical. The water may be water containing a fertilizer. The chemical may include nitrate. The chemical may include phosphate. The membrane may be engineered to deliver nitrate and phosphate at different rates.

According to a second aspect of the invention there is provided a drip irrigation line comprising a semipermeable membrane that is preferentially water permeable, the membrane being configured as a conduit.

According to a third aspect of the invention there is provided a drip irrigation line comprising:
a water permeable conduit; and
a semipermeable membrane that is preferentially water permeable associated with the conduit.

In some embodiments, the membrane is located within the conduit. The membrane may line an internal surface of the conduit. Alternatively, the membrane may line an external surface of the conduit.

According to a fourth aspect of the invention there is provided an irrigation system, the system comprising:
a drip irrigation line in accordance with either one of the second and third aspects of the invention in contact with a soil or soil analogue.

The system may further comprise a supply of brackish water in the conduit, the water having a pressure in the range of ambient pressure to a few atmospheres.

According to a fifth aspect of the invention there is provided a method of irrigating a plant, the method comprising the steps of:
providing a source of brackish water;
providing a drip irrigation line in accordance with either one of second and third aspects of the invention;
locating at least part of the drip irrigation line on or in a soil or soil analogue supporting the plant; and
causing the brackish water to flow from the source to the drip irrigation line.

The brackish water in the conduit may have a pressure in the range of ambient pressure to a few atmospheres of pressure.

According to a sixth aspect of the invention there is provided a method of fabricating a drip irrigation line, the method comprising the steps of:
providing a water permeable conduit; and
forming adjacent an inside surface of the conduit a semipermeable membrane that is preferentially permeable to water.

According to a seventh aspect of the invention there is provided a method of watering a plant, the method comprising the step of using a water potential of a plant root and/or a soil or soil analogue supporting the plant root to attract a supply of water through a semipermeable membrane that is preferentially water permeable.

In an embodiment of any one of the aspects of the invention, the semipermeable membrane is preferentially permeable to water over salt. The membrane is configured to desalinate water.

BRIEF DESCRIPTION OF THE FIGURES

In order to achieve a better understanding of the nature of the present invention embodiments will now be described, by way of example only, with reference to the accompanying figures in which.

DETAILED DESCRIPTION OF EMBODIMENTS OF THE INVENTION

Figure 1:
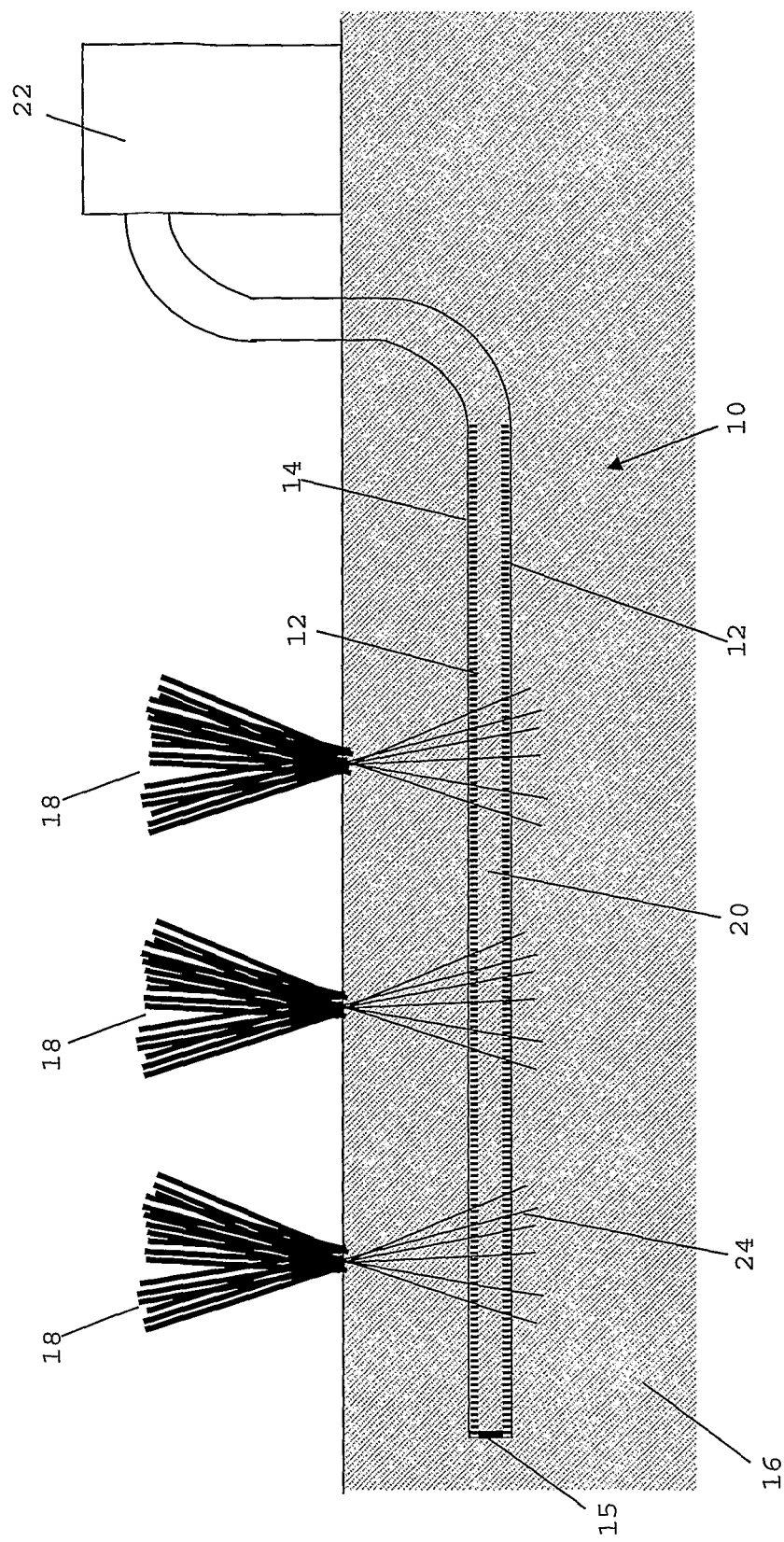
FIG. 1 shows an embodiment of a plant watering device buried in a soil beneath a crop in cross action.

One embodiment of a plant watering device is shown in FIG. 1 and is generally indicated by the numeral 10. In this embodiment, the device has a preferentially water permeable membrane 12 (shown in vertical hashing) lining a water permeable conduit 14. In another embodiment, however, the conduit and the membrane are the same. In these embodiments the conduit 14 is a drip irrigation line. The conduit shown in FIG. 1 is able to transport water 20 away from the membrane 12. The conduit 14 is air blown polyethylene pipe. The conduit 14 may be closed at one end 15 or alternatively be in communication with the source 22 at both ends. The irrigation line 14 is at least part buried in soil 16 of a field in which plants such as 18 are grown. The conduit 14 carries brackish water 20 containing dissolved salts such as sodium chloride. The conduit 14 is connected to and gravity fed from a water source 22 replenished from a natural source of brackish water. The water is not in this embodiment especially pressurized and does not require more pressure than that required to transport the water 20 into the conduit 13. Typically, as in this embodiment, the water pressure is around ambient pressure up to a few atmospheres. In some alternative embodiments, however, the device 10 may include a low pressure water pump to transport the water 20 into the conduit 12. The membrane 14 separates a supply of the brackish water 20 in the conduit from the root system 24 of a plant 18.

In this embodiment, the subsurface drip irrigation line 14 at least partially demineralises and/or desalinates the brackish water to provide fresher water for the plants 18. It will be appreciated that as better membrane technologies become available for use in the device, the drip irrigation line may be able to desalinate considerably salinated water. The desalination is achieved by reverse osmosis of the water 20 through the membrane 12. The membrane 12 has selective transport properties of the water 20 and the salt dissolved therein. The reverse osmosis process is not primarily driven by pressurising the water 20 as for a seawater desalination plant, such as that being built at Kurnell, Sydney which will operate at water pressures from 40 to 70 bars or atmospheres of pressure. Fortunately, less pressure is required to desalinate brackish water, from 2 to 17 atmospheres. The water potential gradient that drives the reverse osmosis in the present invention is provided by the soil 16 and plant roots 24 which each have a water potential substantially less than that of the brackish water 20 itself. However, it will be appreciated that in some embodiments a degree of pressurization is beneficial.

Looked at another way, fresher water that diffuses to the outside face of the membrane 12 is wicked away by the capillary action by the soil 16, which is a good wicking medium, and then the water 20 is driven by osmosis into the root 24. Roots have a lower water potential than soil, generally. This promotes the further net transport of water 20 molecules across the membrane 12. The transport of salt across the membrane 12 is not promoted by the water potential and is thus substantially trapped in the water supply 20.

In normal operation of this embodiment, transpiration water loss by plants 18 causes a low water potential 16 to appear at the root surface 24. This acts to draw water from the soil 16 to the root 24. As the soil 16 near the root is dried, it too displays a low water potential that draws water from further away. Typical values of this potential are within the range −0.1 bar (field capacity) to −15 bars (permanent wilting point). A root water potential of about −3 to −5 bar is sufficient to maintain an adequate water flux across the membrane 20. This is well within normal experience for a plant.

Because the plant 18 is generating the pressure gradient to draw water out of the irrigation line 12, the fresher water 20 will be drawn out only where plant roots 24 are active. This means that the remainder of the line 12 will not release water into the soil 16 as the water potential gradients will be inward. Thus salt buildup in the soil 16, from the fresher water, will be minimal and can easily be managed with slight solute movement from occasional rain.

The membrane 12 is a reverse osmosis membrane and is a dense synthetic polymer film, the polymer being polyamide. Generally, standard membranes of 10-40 μm thickness (such as those produced by Dow Chemicals) should be suitable. Membranes with a water flux in the range of 0.1-20 L/m$^2$/hr at 1-10 atm of pressure and a salt removal of 50-100% should be suitable, depending on the salt content of the water and other parameters such as transpiration water loss rates. The membrane 12 is deposited using interfacial polycondensation 14. In other embodiments, the membrane may be a cellulose acetate membrane, an ultrafiltration and/or a nanofiltration membrane. Cellulose acetate provides acceptable salt removal for drip irrigation in many circumstances. Additionally as cellulose acetate is hydrolysed above pH 5.5 it is possible to dissolve the pipe in situ by flushing the line with an alkaline solution. As cellulose is readily biodegradable, this type of subsoil drip irrigation pipe would afford a more sustainable approach in contrast to the current contamination of fields with persistent polyethylene lines. This advantage may be present for embodiments in which the membrane and the conduit are the same.

Particularly in embodiments in which the conduit and the membrane are the same, a drip irrigation tape is a convenient form for the line to take as it can be run off a spool on the back of a tractor into a prepared furrow.

Figure 2:
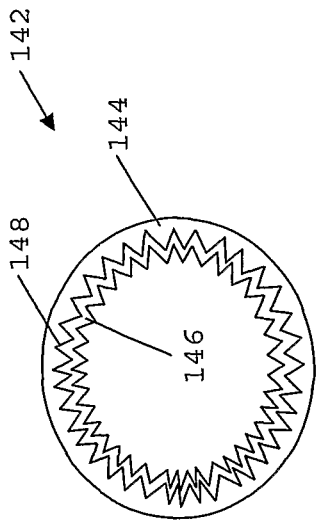
FIG. 2 shows a cross-sectional view of an embodiment of a drip irrigation line configured to promote turbulence in a fluid flowing through it, wherein the conduit and the membrane are the same.

FIG. 2 shows a cross section of one embodiment of a drip irrigation line generally indicated by the numeral 130 in which the conduit and the membrane are the same and indicated by the numeral 132. The drip irrigation line 130 may be formed of a cellulosic material, for example, or any other suitable membrane material. That is, the membrane is configured as the conduit. The conduit has a nominal central axis 135. The drip irrigation line 30 may be formed, for example by first casting the membrane as a sheet, bringing opposing edges of the sheet together and then subsequently fixing the edges together to form the conduit. The fixing of the edges may be achieved by heating and/or anealling, for example, or through the use of an adhesive. The membrane 132 is configured to promote turbulence in a fluid flow adjacent to the membrane 132 within the drip irrigation line 130. In this example, the surface 133 comprises features in the form of ridges such as 134 that promote the turbulence. The ridges 132 may have various configurations such as parallel and curvy ridges such as 136 in FIG. 4 or crossing ridges 138, 140 forming a cross hatch pattern such as FIG. 5.

Figure 3:
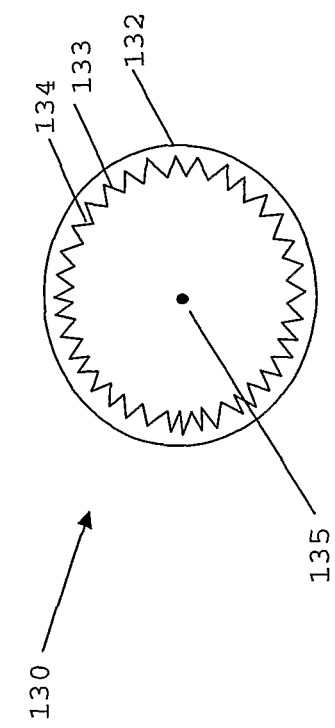
FIG. 3 shows a cross sectional view of another embodiment of a drip irrigation line configured to promote turbulence, wherein the membrane lines the conduit.

FIG. 3 shows a cross section view through another embodiment of a drip irrigation line generally indicated by the numeral 142 having a conduit 144 which is lined by a membrane 146. The conduit comprises features in the form of ridges such as 148 that shape the membrane 146 for the promotion of the turbulence. The membrane is shaped to have ridges, in this example.

Of course it will be appreciated that the ridges may be replaced by any feature that causes turbulence such as bumps or dimples.

Figure 6:
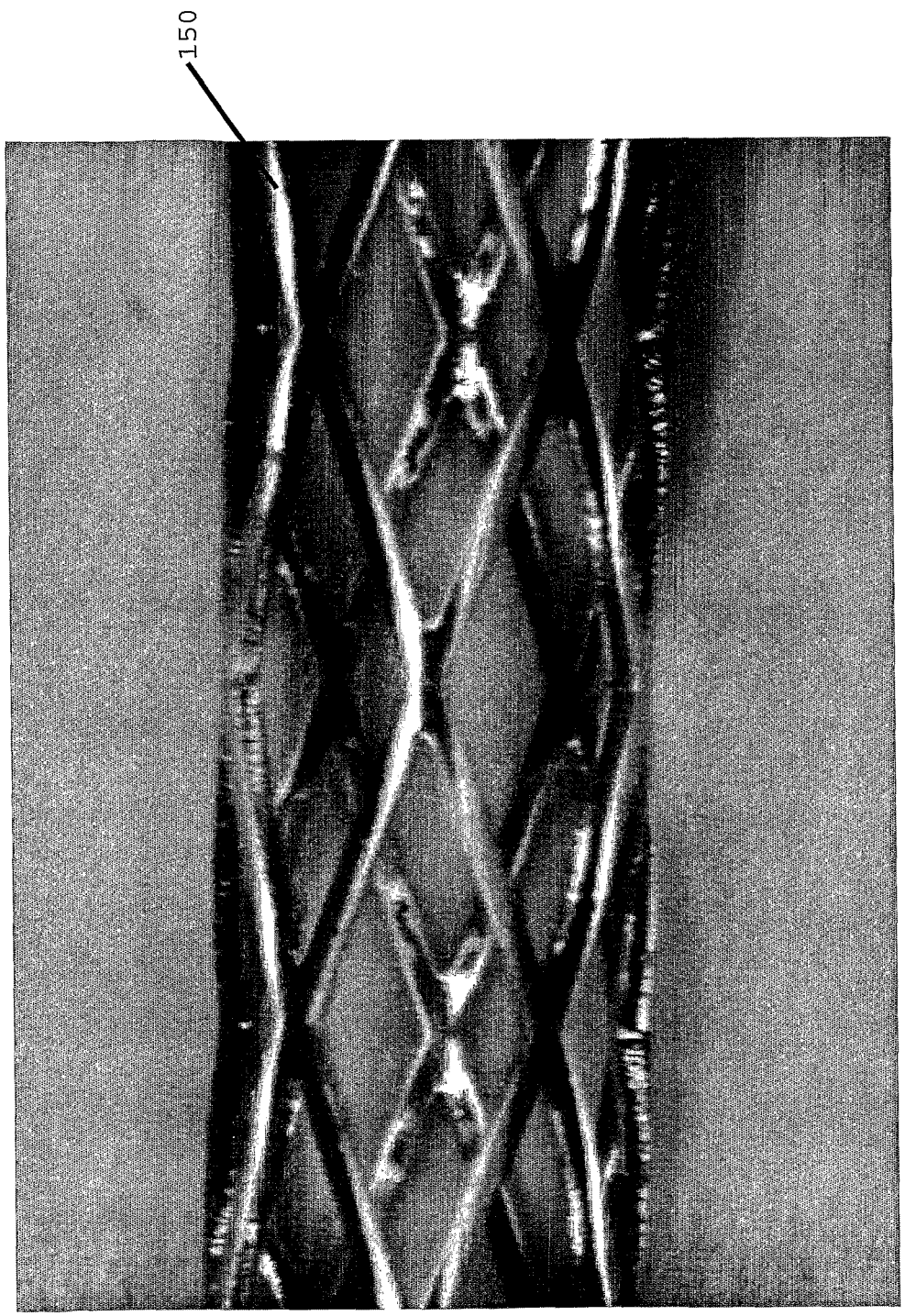
FIG. 6 shows one embodiment of a structure around which a membrane is located.

In some alternative embodiments, a membrane is formed around a structure configured to promote turbulence in a fluid flow adjacent to the membrane. One example of such a structure is shown in FIG. 6 and generally indicated by the numeral 150. In this embodiment of a structure, the structure is in the form of a framework. The framework may be formed of a material other than that of the membrane such as some other polymer or other suitable material.

Figure 5:
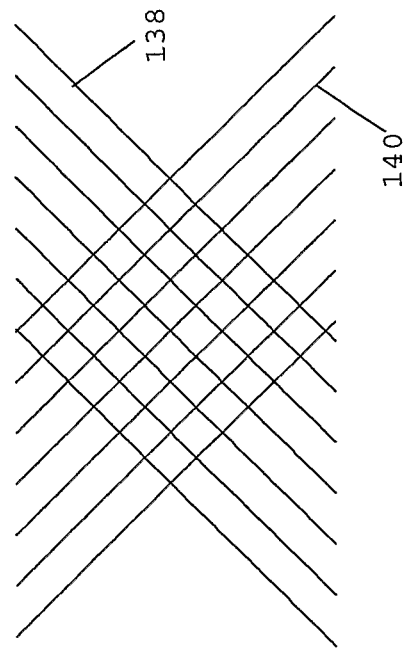
FIG. 5 shows a cross hatch ridge pattern used to promote turbulence in yet another embodiment of a drip irrigation line.
Figure 4:
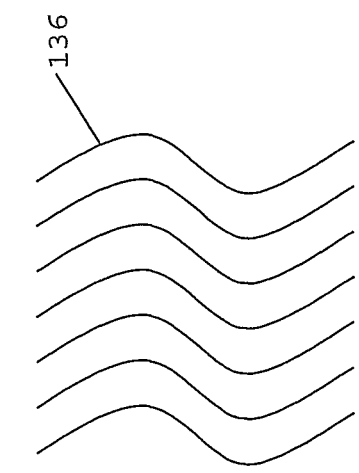
FIG. 4 shows a parallel ridge pattern used to promote turbulence in another embodiment of a drip irrigation line.

In the embodiments shown in FIGS. 4 and 5, for example, the irrigation line may not be closed at one end and the water is pumped through the line and may be returned to the supply 22. The water might be pumped through the line at a velocity ranging from 0.05 to 0.5 meters per second, for example. The turbulence assists in limiting the accumulation of an increased salt concentration adjacent the membrane which decreases the net passage of salt across the membrane and into the soil matrix. It may also increase the rate at which water diffuses across the membrane.

In a variation of the embodiment shown in FIG. 1, the membrane 20 is preferably permeable to a fertilizing chemical dissolved in the water supply 20. The chemical may include nitrate and/or phosphate, and the membrane 20 may be selected to be more permeable to nitrate than phosphate to provide an optimal delivery ratio of the salts to the plant 18.

One embodiment of the drip irrigation line, such as that shown in FIG. 1, may be fabricated by providing a water permeable conduit, and then forming a preferentially water permeable membrane 12 adjacent an inside surface of the conduit 14. The membrane 12 can be deposited using techniques such as interfacial polycondensation, interfacial polymerization (saturating the surface with a monomer and then polymerizing) and phase inversion of a polymer from a liquid to a solid phase. Microporous films may be cast or spun from organic polymers by various proprietary techniques based on the phase inversion casting process. In the phase inversion process a well solvated polymer is induced to precipitate, or "gel" as a solid film. The phase change for the polymer in the solvated (liquid state) to the solid state can be induced by reaction with a non solvent or by temperature. For example, crystalline cellulose acetate will dissolve in a mixture of acetone and pyridine, then precipitate as a microporous film at the interface between the organic solvent and an aqueous solution. A similar change of phase is observed with polypropylene, which will exist in a solvated form in an organic solvent at over 150° C. and will revert to a crystalline form at a temperature of 150° C.

Figure 7:
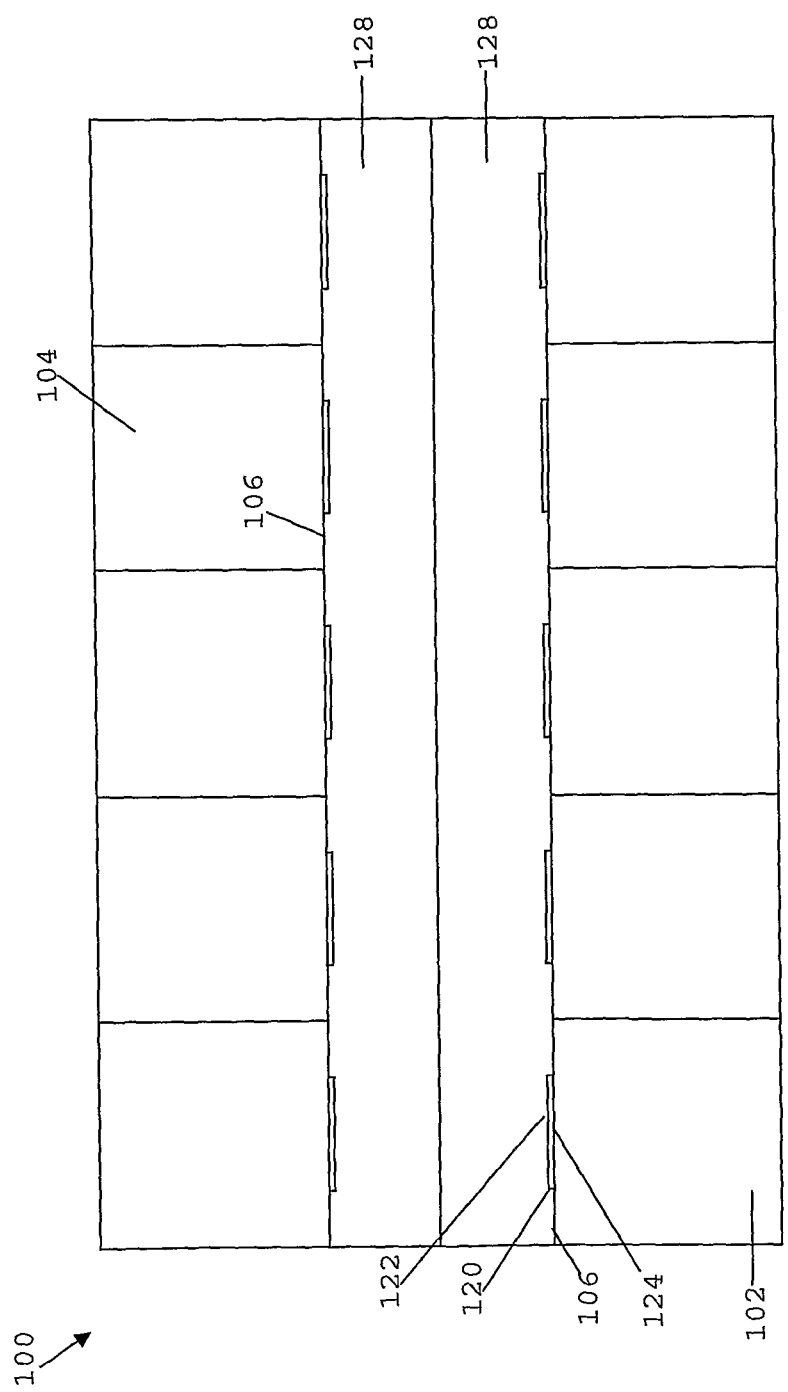
FIG. 7 shows a plan view of another embodiment of a plant watering device.
Figure 8:
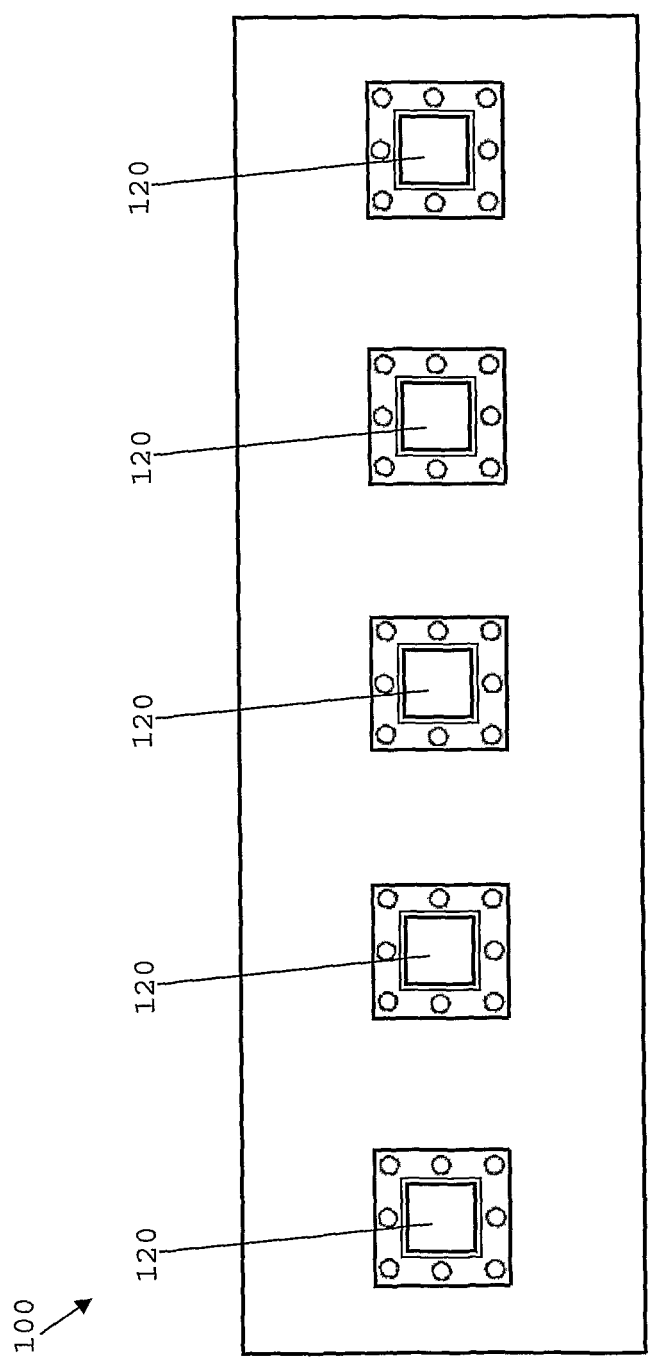
FIG. 8 shows a side view of an internal wall of the embodiment of FIG. 2 including membranes.

FIGS. 7 and 8 show a plan and an inside elevational view of another embodiment of a plant watering device 100. The device has 10 pot portions such as 102 and 104 into which soil or a soil analogue is placed. A plant, such as an Apollo tomato plant, is then planted in the soil which supports the root system of the plant. Each pot portion includes a sidewall 106 including a membrane portion 120, the membrane portion 120 having two opposite faces 122 and 124. One of the faces 122 is arranged to be contactable with a supply of brackish water in one of two troughs 128. The other face 124 is arranged to be contactable with a wicking medium. Sheets of P & S polypropylene was installed on the soil side of the device to reduce the risk of root structures piecing the membrane 20. Soil or soil analogue contacts the polypropylene sheet in the pot portion 102. Again, the membrane 120 processes the brackish water to fresher water delivered into the pot portion 102 through reverse osmosis driven by the plant itself. The supply of brackish water 128 may include a water holding material like a sponge like or a soil-like material to, amongst other things, prevent spillage of the water.

In more detail, in this embodiment the device 100 is constructed out of 8 mm perspex. Windows with dimensions 60 mm by 60 mm cut into the Perspex. The windows each have an O ring groove milled around the hole in order to provide a water tight seal when the membrane 120 is in place. Each window had a perspex frame made from 4.5 mm perspex produced in order to secure the membranes.

Example

In one trial performed by the applicants, Apollo tomato plants were planted in the pot portions 102. No other nutrients or pesticides were used throughout the duration of the experiment.

Each watering channel 128 of the plant box was filled with twenty (20) liters of 3000 ppm saline solution (2.5 g/L sodium chloride, 0.2 g/L calcium carbonate and 0.5075 g/L magnesium sulphate). The trial was repeated using potable tap water as a baseline comparison. The watering solution and the water channel 128 is returned to this level at the end of each day.

Both mixed cellulose ultrafiltration (Millipore Hydrophilic #GSWP 090 25 GS filter type with a pore size of 0.22 μm) and reverse osmosis membranes (FILMTEC BW30) were trialed in the device 100. In all cases, the tomato plants grew satisfactorily as defined by leaf counts and fruit production.

The soil analogue in each pot 102 comprises of 50% recycled green waste, 20% soil, 10% course sand, 10% botany sand and 10% composted hardwood sawdust. The soil analogue may be any suitable analogue, such as a hydroponic medium or some other inert medium. The soil analogue may be a foam or other porous material.

Now that embodiments have been described, it will be appreciated that some embodiments have some of the following advantages:

Brackish water, which is in many places in good supply, can be used as a source of fresher water for growing plants.

The drip irrigation line can be gravity fed reducing the need for power and machinery such as pumps.

No pre-treatment of the brackish water is required to irrigate the plants using the irrigation line.

The reverse osmosis system does not require the brackish water to be pressurized to the extent that sea water desalination plants require;

The reverse osmosis process is driven almost entirely by the plant and soil.

The drip irrigation line is a linear geometry which is well suited to watering rows of crops or plants as found on farms, orchards, etc.

Water is only supplied when needed by the plant and thus over-watering which may damage the soil or deposit salt therein is ameliorated.

Fertiliser can be delivered.

The line can be degraded when no longer required, instead of becoming pollution or requiring removal which can be time consuming and/or expensive.

A variety of membrane types can be used as required to meet to circumstances.

Turbulence is used to improve performance.

The invention is not limited to supplying fresher water from brackish bore water. It may, for example, be used to remove a pollutant or other dissolved substance in a water supply. The water supply may be from an industrial facility, and the invention used anywhere a non-fresh source of water is available.

It will be appreciated that numerous variations and/or modifications may be made to the invention as shown in the specific embodiments without departing from the spirit or scope of the invention as broadly described. For example, the brackish water may be pressurized to enhance the reverse osmosis. The membrane may cover a pond or pool of brackish water over which soil is placed. A plurality of lines may be arranged or grouped to increase fresh water delivery. The line may be coiled in a plane. The line may be coiled into a helix-like arrangement for placement in a plant growing vessel, for example. The present embodiments are, therefore, to be considered in all respects as illustrative and not restrictive.

The invention claimed is:

1. A plant watering device, the device comprising:
a semipermeable membrane arranged to separate a supply of water from a root system of a plant, wherein the semipermeable membrane has a water flux in a range of 0.1 L/m$^2$/hr to 20 L/m$^2$/hr at 1-10 atmospheres (atm) of pressure such that in use, water is allowed to permeate through the semipermeable membrane in response to a soil and/or root water potential by virtue of reverse osmosis to thereby water the roots of the plant.

2. A plant watering device defined by claim 1 wherein the semipermeable membrane is arranged such that in use, a supply of water containing a dissolved salt is separated from the root system of the plant.

3. A plant watering device defined by claim 1 wherein the semipermeable membrane is configured to selectively transport salt-reduced or demineralized water from the supply of water to the roots of the plant in response to the soil and/or root water potential.

4. A plant watering device defined by claim 1 wherein the semipermeable membrane is degradable or soluble.

5. A plant watering device defined by claim 1 wherein the semipermeable membrane lines a permeable conduit or is configured as a conduit.

6. A plant watering device defined by claim 1 wherein the conduit is a drip irrigation line.

7. A plant watering device defined by claim 1 wherein the semipermeable membrane has two opposing faces, wherein one of the faces is arranged to be contactable with the supply of water and the other face is arranged to be in contact with a water wicking medium or a medium with a water potential which is lower than that of the supply of water.

8. A plant watering device defined by claim 1 wherein the semipermeable membrane is permeable to a fertilizing chemical.

9. A plant watering device defined by claim 1 configured to promote turbulence in the supply of water adjacent to the semipermeable membrane.

10. The plant watering device defined by claim 1, wherein the soil and/or root water potential which allows water to permeate through the semipermeable membrane (i) is lower than the water potential of the supply of water, and (ii) is in a range of −0.1 bar to −15 bars.

11. The plant watering device defined by claim 1, wherein the soil and/or root water potential is in a range of −3 bar to −5 bar.

12. A drip irrigation line comprising:
a water permeable conduit; and
a semipermeable membrane associated with the conduit, wherein the semipermeable membrane has a water flux in a range of 0.1 $L/m^2/hr$ to 20 $L/m^2/hr$ at 1-10 atmospheres (atm) of pressure such that in use, water is allowed to permeate through the semipermeable membrane in response to a soil and/or root water potential by virtue of reverse osmosis to thereby water roots of a plant.

13. An irrigation system, the system comprising:
a drip irrigation line defined by claim 12 in contact with a soil or soil analogue.

14. An irrigation system as defined by claim 13 further comprising a supply of brackish water.

15. A method of irrigating a plant, said method comprising the steps of:
providing a source of brackish water;
providing a drip irrigation line defined by claim 12;
locating at least part of the drip irrigation line on or in a soil or soil analogue supporting the plant; and
causing the brackish water to flow from the source to the drip irrigation line.

16. A method for fabricating a drip irrigation line as defined by claim 12, the method comprising the steps of:
providing a water permeable conduit; and
forming adjacent an inside surface of the conduit the semipermeable membrane.

17. The drip irrigation line defined by claim 12, wherein the soil and/or root water potential which allows water to permeate through the semipermeable membrane (i) is lower than the water potential of a supply of water passed through the drip irrigation line, and (ii) is in a range of −0.1 bar to −15 bars.

18. The drip irrigation line defined by claim 17, wherein the soil and/or root water potential is in a range of −3 bar to −5 bar.

19. A method of watering a plant, the method comprising the steps of using a water potential of a plant root and/or a soil or soil analogue supporting the plant root to attract a supply of water through a semipermeable membrane that has a water flux in a range of 0.1 $L/m^2/hr$ to 20 $L/m^2/hr$ at 1-10 atmospheres (atm) of pressure such that water is allowed to permeate through the semipermeable membrane in response to a soil and/or root water potential by virtue of reverse osmosis to thereby water roots of the plant.

20. A method of watering a plant defined by claim 19 wherein the semipermeable membrane selectively transports salt-reduced or demineralized water from the supply of water to the roots of the plant in response to the soil and/or root water potential.

21. A drip irrigation line defined by claim 12 wherein the semipermeable membrane is configured to selectively transport salt-reduced or demineralized water from a supply of water passed though the irrigation line to the roots of the plant in response to the soil and/or root water potential.

22. A drip irrigation line comprising a semipermeable membrane configured as a conduit, wherein the semipermeable membrane has a water flux in a range of 0.1 $L/m^2/hr$ to 20 $L/m^2/hr$ at 1-10 atmospheres (atm) of pressure such that in use, water is allowed to permeate through the semipermeable membrane in response to a soil and/or root water potential by virtue of reverse osmosis to thereby water the roots of a plant.

\* \* \* \* \*